April 28, 1942.  C. C. CLARK  2,281,480
ARTIFICIAL BAIT
Filed Sept. 23, 1940   2 Sheets-Sheet 1
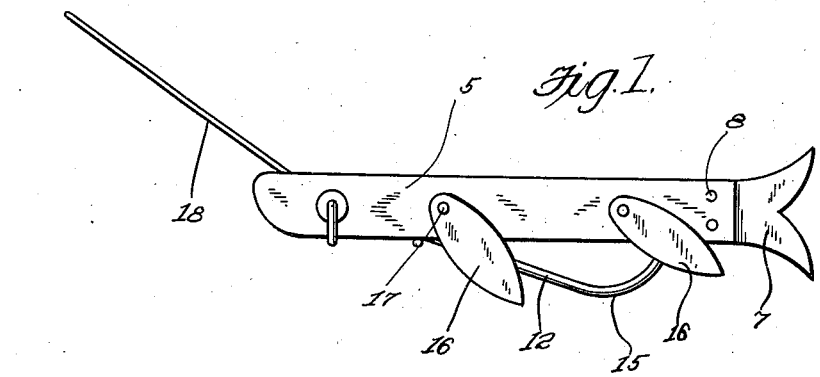
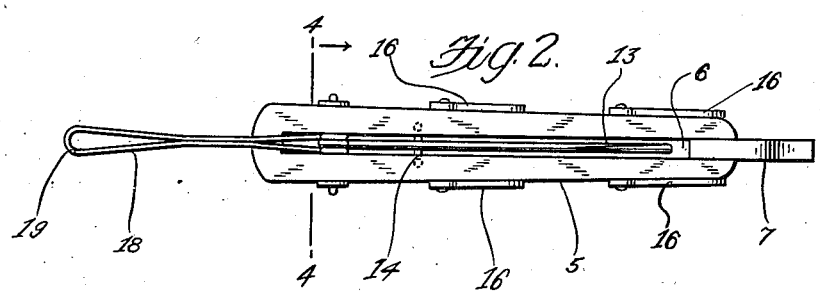
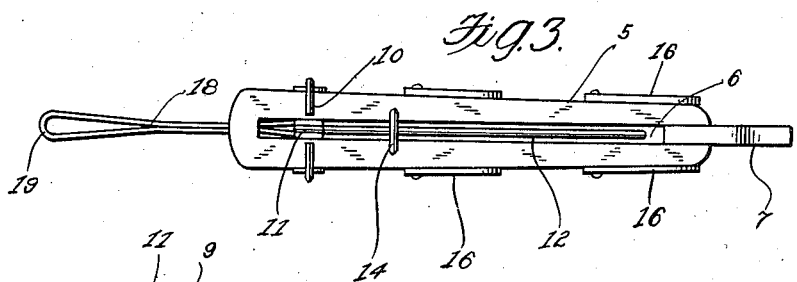
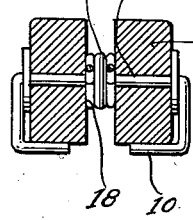
Inventor
Charles C. Clark
By Clarence A. O'Brien
Attorney

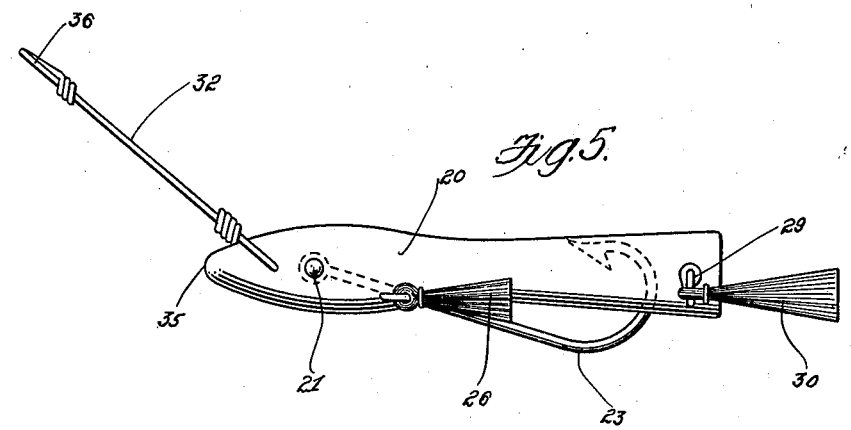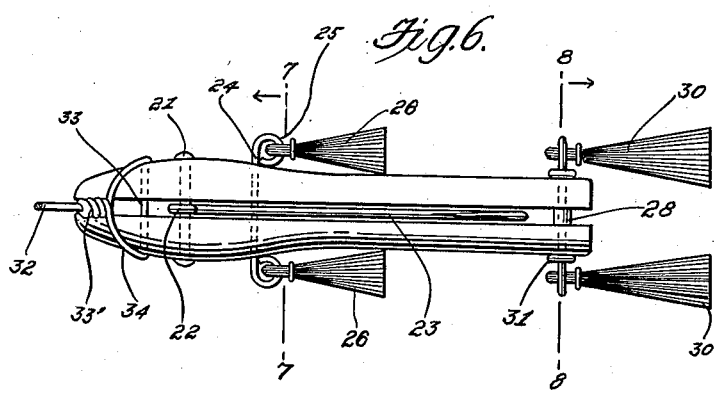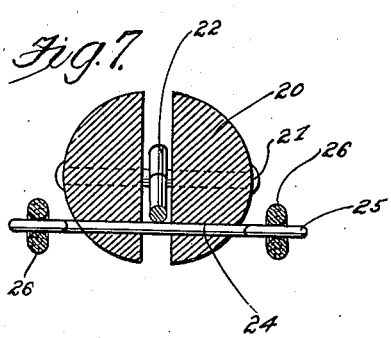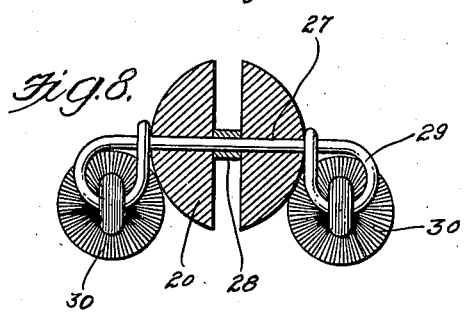

Patented Apr. 28, 1942

2,281,480

UNITED STATES PATENT OFFICE 2,281,480

ARTIFICIAL BAIT

Charles C. Clark, Marshall, Wis., assignor of forty per cent to George Kleinsteiber, Jr., Marshall, Wis.

Application September 23, 1940, Serial No. 357,960

4 Claims. (Cl. 43—39)

The present invention relates to new and useful improvements in artificial baits and more particularly to an artificial minnow in which the body is provided with a slotted opening adapted to receive the barb of the hook to maintain the same in a protected position against engagement by weeds and other objects with which the minnow may come into contact during trolling, the hook being pivotally mounted and with the back portion thereof exposed for engagement by the jaws of the fish whereby to project the barb end thereof outwardly for hooking into the fish's mouth.

A further object is to provide a device of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, wherein reference is had to the accompanying drawings forming part hereof, and wherein like numerals refer to like parts throughout, and in which—

Figure 1 is a side elevational view of one embodiment of the invention,

Figure 2 is a top plan view,

Figure 3 is a bottom plan view,

Figure 4 is a transverse sectional view taken substantially on a line 4—4 of Figure 2, Figure 5 is a side elevational view of a modified form of the invention, Figure 6 is a top plan view, and Figures 7 and 8 are transverse sectional views taken respectively on the line 7—7 and 8—8 of Figure 6.

Referring now to the drawings in detail and with particular reference to Figures 1 to 4 inclusive, the numeral 5 designates the body portion of the artificial minnow which is of substantially rectangular form and provided with a vertically extending slotted opening 6 and extending from a point adjacent the front end of the body through the rear end thereof. A tail member 7 is secured in the rear end of the slotted opening 6 by means of rivets or the like 8, the tail closing the rear end of the slot as shown in Figures 2 and 3 of the drawings.

A pivot pin 9 extends transversely of the body adjacent the front portion of the slotted opening 6, the ends of the pin projecting outwardly at each side of the body and being bent under the lower edge of the body as shown at 10. Pivotally mounted on the pin is the eye 11 of the hook 12, the barb 13 of the hook being maintained within the slotted opening 6 by means of a stop member 14 which is secured to the under side of the body and bridges the slotted opening 6 adjacent its front end and immediately rearwardly of the pivot pin 9. The stop 14 supports the hook with its back portion 15 exposed beneath the bottom of the body 5 as shown to advantage in Figure 1 of the drawings, so that the barb 13 is moved outwardly of the slotted opening for engaging the jaws of the fish when the fish grabs the minnow.

At each side of the body 5, at an intermediate portion thereof, are flat members 16 of simple leaf form which are pivoted at their front ends on pins 17 projecting from the sides of the body and which simulate the fins of the minnow. The fins 16 are pivoted on the pins 17 in order not to interfere with the upward movement of the hook when grabbed by the fish.

Also secured to the front pin 9 is a U-shaped wire leader 18, the end portions of the leader being secured to the pin and the intermediate portion of the leader projecting forwardly and upwardly from the body 5 to form a line attaching loop 19.

In Figures 5 to 8 inclusive I have illustrated a modified form of the invention in which the body of the minnow is designated at 20 and is formed of a pair of duplicate sections having flat opposed surfaces and rounded outer surfaces as shown in Figures 7 and 8 of the drawings, the sections being connected by a transversely extending pin 21 on which the eye 22 of the hook 23 is pivotally mounted.

Immediately rearwardly of the pin 21 is a transversely extending pin 24 which is disposed under the hook 23 to form the stop therefor and the ends of the pin 24 are bent to form rearwardly extending eyes 25 projecting outwardly from each side of the body.

Adjacent the rear end of the body is a transversely extending pin 27 on which is mounted a spacing member 28 disposed between the sections of the body to maintain the same in spaced relation and each end of the pin 27 is bent outwardly to form the eyes 29 for also attaching tufts of hair or bristles 30, the tufts 26 and 30 simulating the fins of the fish. The extremities of the pin 27 are bent over the pin outwardly of the sides of the body to prevent spreading action of the sections of the body.

A wire leader 32 has a portion inserted transversely of the body of the minnow as shown at 33 and positioned in advance of the pin 21, the end of the wire being twisted as shown at 33' to anchor the same to the front end of the body to provide a loop 34 which terminates rearwardly of the nose 35 of the body to maintain the leader in an upwardly extended position. The front end of the leader is provided with a line attaching loop 36.

It is believed the details of construction, advantages and manner of use of the device will be readily understood from the foregoing without further detailed explanation.

Having thus described the invention what I claim is:

1. An artificial bait comprising an elongated body having longitudinal portions thereof spaced apart, a pin transversely of the body adjacent its front end, a hook pivoted on said pin and disposed between said longitudinal spaced portions of the body, and adapted for projecting outwardly at opposite sides of the body, means carried by the body and engaging the shank of the hook adjacent its pivoted end for supporting the hook against movement in one direction with the barb thereof protected by the body, and a towing line attached to the front end of the body and adapted to maintain the body in a position with the hook resting on said supporting means.

2. An artificial bait comprising an elongated body having longitudinal portions thereof spaced apart, a pin transversely of the body adjacent its front end, a hook pivoted on said pin and disposed between said longitudinal spaced portions of the body, means carried by the body and engaging the shank of the hook adjacent its pivoted end for supporting the hook against movement in one direction with its rear portion projecting from the under side of the body and with the barb of the hook protected by the body, said barb being movable outwardly from the top of the body upon the striking of the bait by a fish, and a towing line attached to the front end of the body and adapted to maintain the body in a position with the hook resting on said supporting means.

3. An artificial bait comprising an elongated body having spaced longitudinal portions, a pin extending transversely adjacent the front end of the body, a hook pivotally mounted on said pin, a second pin extending transversely of the body rearwardly of said first pin and bridging the spaced portions of the body, said hook engaging said second named pin to limit movement of the hook in one direction and for maintaining the hook with the barb thereof protected by the body, the rear portion of the hook being exposed for engagement by a fish striking the bait and adapted to move the barb portion thereof outwardly from the body, a leader attached to said first named pin, and artificial fins attached at opposite sides of the body.

4. An artificial bait comprising an elongated body having a vertically extending slotted opening therein, a pin extending transversely of said body through said opening, a fish hook pivotally mounted on said pin, a pin bridging said opening at the bottom portion of the body and positioned rearwardly of said first named pin to provide a stop limiting downward movement of the hook and normally supporting the hook with the barb thereof positioned in the slotted opening and with the rear portion of the hook projecting downwardly from the body, a leader attached to the front of the body and imitation fins secured to the sides of said body.

CHARLES C. CLARK.